US 6,643,715 B1

(12) United States Patent
Arthur

(10) Patent No.: US 6,643,715 B1
(45) Date of Patent: Nov. 4, 2003

(54) METHOD AND APPARATUS FOR IMPLEMENTING MULTIPLE V-CHIP SETTINGS FOR A DISPLAY DEVICE WHEREIN THE SETTINGS ARE STORED ON REMOVABLE MEMORY

(75) Inventor: Kelly Arthur, Pembroke (BM)

(73) Assignees: Sony Corporation, Tokyo (JP); Sony Electronics, Inc, Park Ridge, NJ (US)

( * ) Notice: Subject to any disclaimer, the term of this patent is extended or adjusted under 35 U.S.C. 154(b) by 0 days.

(21) Appl. No.: 09/578,029

(22) Filed: May 24, 2000

(51) Int. Cl.[7] ............... G06F 3/00; G06F 13/00; H04N 5/445; H04N 7/16
(52) U.S. Cl. ............... 710/14; 710/8; 710/9; 710/13; 710/62; 710/64; 348/734; 725/25; 725/39
(58) Field of Search ............... 710/8, 9, 14, 62, 710/64; 348/734; 725/39, 25

(56) References Cited

U.S. PATENT DOCUMENTS 5,497,418 A * 3/1996 Kudelski ............... 380/227
6,230,320 B1 * 5/2001 Gakumura ............... 725/25
6,286,141 B1 * 9/2001 Browne et al. ............... 348/734

* cited by examiner

Primary Examiner—Jeffrey Gaffin
Assistant Examiner—Tammara Peyton
(74) Attorney, Agent, or Firm—Wagner, Murabito, Hao LLP

(57) ABSTRACT

A method and apparatus for implementing multiple V-chip settings for a display device. The method comprises several steps, including a first step of receiving a first V-chip setting as input by a user via a graphical user interface. The first V-chip setting is then stored into a first portion of memory. Next, a second V-chip setting is received as input by a user via a graphical user interface. First and second V-chip settings include a maximum allowable TV rating, moving rating, and content rating, as well as other viewer information. The second V-chip setting is stored into a second portion of memory. First and second portions of memory are each separately removable by a user. A desired one of the multiple V-chip settings is selected by a viewer via a graphical user interface and then enabled. The V-chip setting is password protected to provide access security to specific viewers. Finally, media is provided to a display device according to the enabled V-chip setting.

20 Claims, 18 Drawing Sheets

CHILD 1

CHILD 2

CHILD 3

SETTINGS FOR JOHN:

TV-Y, TV-G

G

NO CONTENTS ALLOWED

PRESS (+) TO SAVE

PROGRAM RATED:

TV-PG

BLOCKED

METHOD AND APPARATUS FOR IMPLEMENTING MULTIPLE V-CHIP SETTINGS FOR A DISPLAY DEVICE WHEREIN THE SETTINGS ARE STORED ON REMOVABLE MEMORY

TECHNICAL FIELD

The field of the present invention pertains to display devices with V-chips. More particularly, the present invention relates to the field of implementing multiple V-chip settings for a single display device.

BACKGROUND ART

Current media programming offers a wide range of content for home viewing. The content can range from subject matter appropriate for children to subject matter intended only for mature adults. To compensate for this wide range of media content available to a local viewer, a so called violence-chip (V-chip) has been incorporated into conventional display devices. The V-chip allows a user to preselect what content will be viewable by the display device. Television (TV) content types include "youth" (TV-Y), "young adult" (TV-PG), and television for mature audience (TV-MA). Movie content types include general audience (G), parental guidance (PG), and restricted (R). Thus, the V-chip acts as a filter programmed with user-provided criteria for blocking or passing media content to the display device.

Furthermore, different countries utilize different ratings systems. Currently, the United States and Canada are the only countries who have established rating systems. In the United States there are two rating systems, depending upon the type of program: for movies, the MPAA rating system is enforced and for TV programs, the Parental Guideline Rating system is used. Therefore, the V-Chip can block programs based on their rating, their content, or a combination of both. Since broadcasters in the United States are given the option of not transmitting ratings, some TV manufacturers offer viewers an additional rating system to block programs that are not rated. These variations in media rating systems makes it difficult and frustrating for a viewer to consistently and accurately block desired media content. Therefore, a method to simplify the rating systems and assist in more accurate blocking is needed.

In a typical home, more than one viewer class typically exists. For example, one viewer class might include grade-school level children whose viewing category may be most appropriately set at a TV-Y and movie G rating. Another viewer class in the same home might be subjectively restricted to watching media with a television parental guidance (TV-PG) and PG movie rating. Yet another viewer class in the same home might be the adults who want no restriction on the media they watch, e.g. TV-MA and movie R rating. Consequently, if a common television is used by multiple viewer categories, e.g. a child, teenager, and adult, then a problem arises because only one V-chip setting is saved in a conventional setting.

Referring now to prior art FIG. 1, a flowchart of the conventional process 1000 used for manually programming different V-chip settings in a single television (storing only one setting at a time) for different viewer categories is shown. Step 1002 of the conventional process is to program the single available V-chip setting for a given viewing category, e.g. TV-PG rating. In step 1004, media is screened according to the programmed V-chip setting. Following step 1004, an inquiry, per step 1006, determines whether a new category of user wants to watch television. If no new category of user wants to watch television, then conventional process 1000 ends. However, if a new category of user does want to watch television, then the conventional process 1000 proceeds to step 1010. In step 1010, the single available V-chip setting is reprogrammed for the new category of viewer watching television. As a result of this process, the original V-chip setting from step 1002 is erased and written over with the new V-chip setting from step 1010.

The process of reprogramming the V-chip setting for multiple viewer categories becomes even more complicated, time-consuming, and error-prone than programming a V-chip setting for a single viewer category. This is because the same V-chip settings may have to be alternatingly and repeatedly reset for the television, each time the viewer category cycles. For example, if a child watches the television in the morning, the V-chip setting must be programmed for a child's level of content. Subsequently, if a mature adult wants to view programs with more mature content in the evening, then the V-chip setting must be reprogrammed for the adult's level of content. If this process repeats itself, e.g. every day, then the V-chip settings must be reprogrammed twice per day. As mentioned, this can be frustrating and time-consuming. Consequently, a need arises for eliminating the need to constantly reprogram the V-chip setting each time the viewer category changes.

Additionally, there is no guarantee that a given V-chip setting will be properly set or controlled. For example, given the difficulty of reprogramming the V-chip setting, it is foreseeable that an inappropriate V-chip settings will be left on the television for a subsequent viewer. Or it is foreseeable that a V-chip setting may be incorrectly set, given the frequency of changing the settings. For example, if the V-chip setting is not reset in the morning for the young viewer, then the young viewer may have access to media beyond their intended level. Additionally, there is no guarantee that the V-chip setting cannot be reset by some other member in the household. Consequently, a need arises for a method and apparatus that provides some control and security on the V-chip setting available for a given viewer.

SUMMARY OF THE INVENTION

The present invention provides a method and apparatus for implementing multiple V-chip settings on a display device, e.g. a television or some other media rendering device. By doing so, the present invention eliminates the need to constantly reprogram the V-chip setting each time the viewer category changes. Furthermore, the present invention also provides a method and apparatus with control and security features for the V-chip setting available to a given viewer.

Specifically, one embodiment of the present invention provides a method for implementing multiple V-chip settings for a display device, e.g. a television or some other media rendering device. The method comprises several steps, including a first step of receiving a first V-chip setting. The first V-chip setting is then stored into a first portion of memory. Next, a second V-chip setting is received. This second V-chip setting is stored into a second portion of memory. This process may be repeated for the desired number of V-chip settings. Then, one of the multiple V-chip settings is enabled by using a remote control or by inserting a memory card that contains the desired V-chip setting. Finally, media is provided to a display device according to the enabled V-chip setting. Thus, the present invention allows multiple V-chip settings to be programmed at one time in memory, and thereafter enabled individually by user interface selection, e.g. a remote control device. Hence, a viewer's time and resources are conserved.

Another embodiment of the present invention provides a display system that implements the method of multiple V-chip settings for a display device. The display system includes a display device, a signal source that is coupled to the display device, a V-chip that is coupled to the signal source, a processor that is coupled to the V-chip, and a computer readable memory coupled to the processor. The computer readable memory has a plurality of portions for storing a plurality of V-chip settings. The computer readable memory also contains program instructions stored therein that, when executed, implement the method for providing one of the plurality of V-chip settings on the display device, as described hereinabove. The memory in which the multiple V-chip settings are stored can be an internal component to the media device, or it can be a removable memory card, e.g. SONY Memory Stick™.

These and other advantages of the present invention will become clear to those of ordinary skill in the art after having read the following detailed description of the preferred embodiments which are described herein.

BRIEF DESCRIPTION OF THE DRAWINGS

The accompanying drawings, which are incorporated in, and form a part of, this specification, illustrate embodiments of the invention and, together with the description, serve to explain the principles of the invention. The drawings referred to in this description should be understood as not being drawn to scale except if specifically noted.

PRIOR ART

FIG. 5A is a V-chip setting scenario for a first child, in accordance with one embodiment of the present invention.

FIG. 5B is a V-chip setting scenario for a second child, in accordance with one embodiment of the present invention.

FIG. 5C is a V-chip setting scenario for a third child, in accordance with one embodiment of the present invention.

FIG. 6G is a seventh graphical user interface (GUI) for entering a V-chip setting, in accordance with one embodiment of the present invention.

FIG. 7B is a second graphical user interface (GUI) for enabling a V-chip setting, in accordance with one embodiment of the present invention.

BEST MODE FOR CARRYING OUT THE INVENTION

Figure 1A:
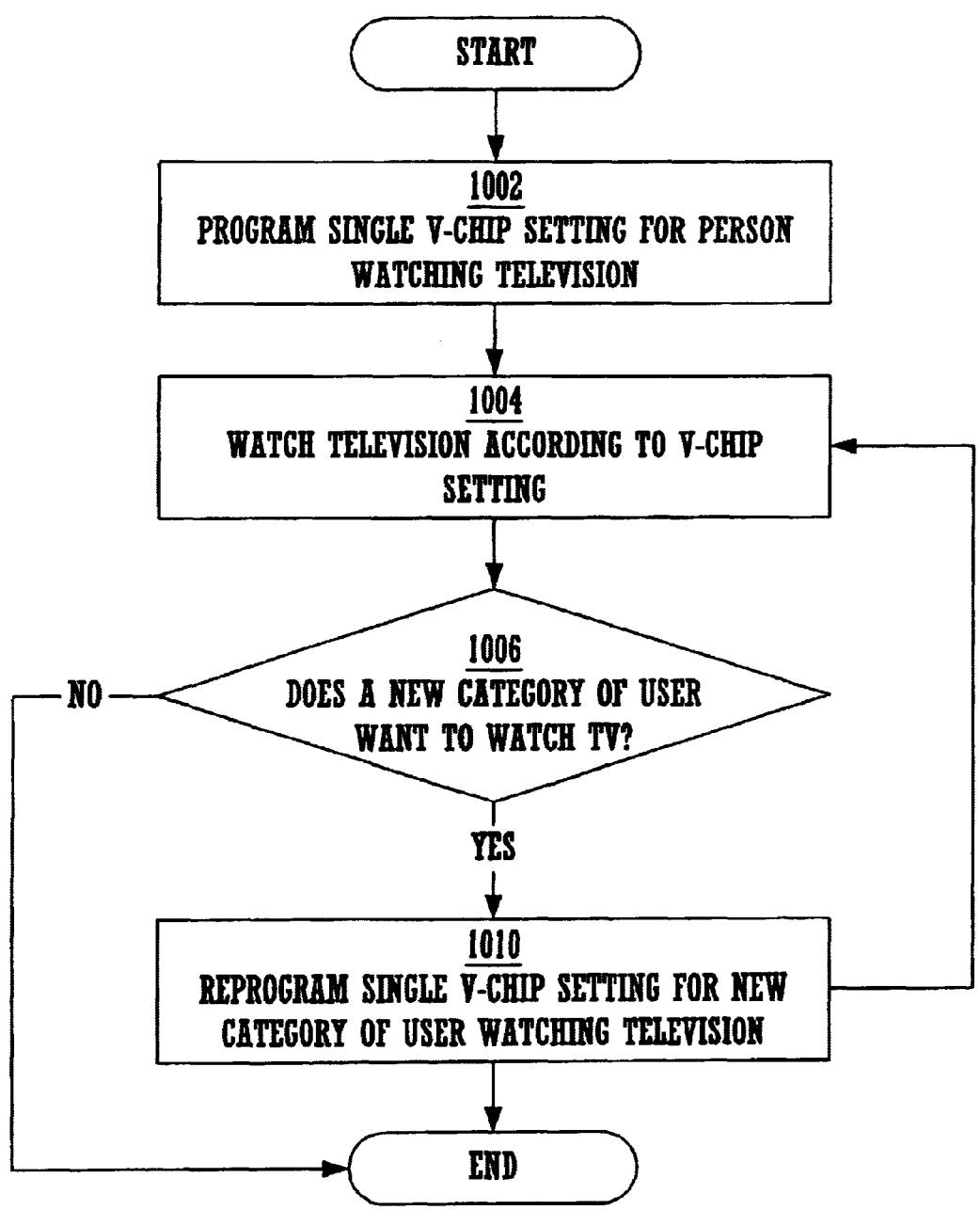
FIG. 1 is a flowchart of the conventional process used for implementing a new V-chip setting in a single television for a different viewer category.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g. the processes, are presented in terms of procedures, logic blocks, processing, and other symbolic representations of operations on data bits within a computer or a digital system memory. These descriptions and representations are the means used by those skilled in the arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving,"

"storing," "enabling," "providing," "protecting," "selecting," or the like, refer to the action and processes that can be implemented by an electronic computing device, that manipulates and transforms data. The data is represented as physical (electronic) quantities within the registers and memories of the device, and is transformed into other data similarly represented as physical quantities within the device components, or computer system memories or registers, or other such information storage, transmission or display devices.

Figure 2A:
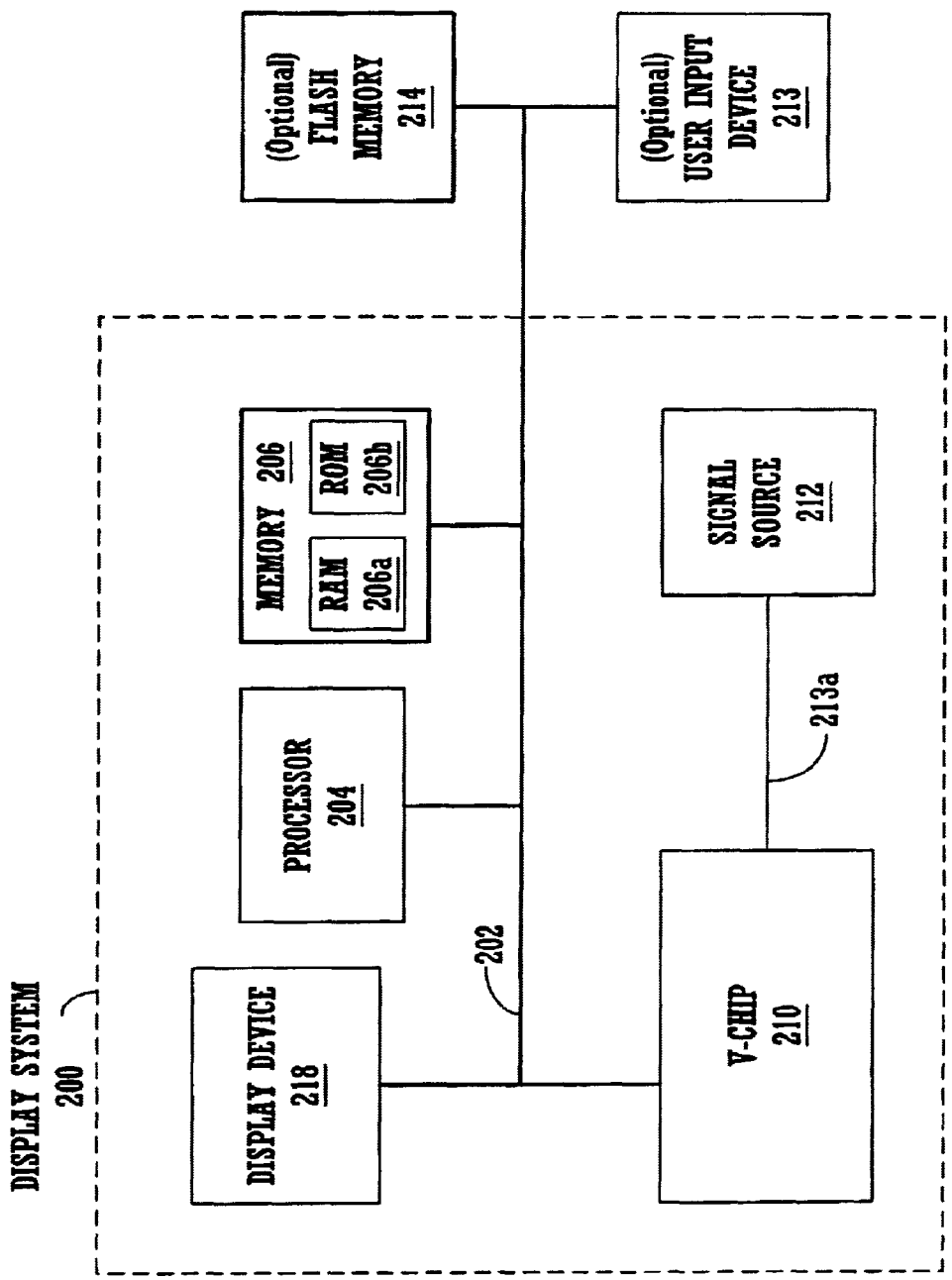
FIG. 2A is a block diagram of a display system for implementing multiple V-chip settings, in accordance with one embodiment of the present invention.

Referring now to FIG. 2A, a block diagram of a display system 200 for implementing multiple V-chip settings is shown, in accordance with one embodiment of the present invention. While display system 200 is an intelligent television system in one embodiment, display system 200 can be any type of media presentation configuration. Display system 200 provides a context in which memory having multiple V-chip settings may be implemented for increased user-convenience and functionality. Display system 200 includes a control/data bus 202 for communicating information, a central processor unit (CPU) 204 for processing information and instructions, and a memory unit 206 for storing information and instructions. Central processor unit 204 and memory unit 206 are coupled to bus 202. Memory unit 206 can include random access memory (RAM) 206a, for storing temporal information and instructions for central processor unit 204, and can include read only memory (ROM) 206b, for storing static information and instructions for central processor unit 204. System 200 also includes a display device 218, for viewing media, a V-chip 210, for filtering media data, and a signal source 212, for providing media data to the display system 200. Display device 218, V-chip 210 are both coupled to data bus 202. Signal source 212 is coupled to V-chip 210 via line 213a for providing a media signal.

Signal source 212 can be any device, such as an antennae for receiving a broadcast, a cable interface for line transmission, or a dish for receiving satellite broadcast. Display device 218 of FIG. 2 can be any type of display, including an analog or a digital television, or a personal computer (PC) display. While processor 204 and memory 206 are shown as individual entities, they may be incorporated into another component. For example, processor 204 and memory 206 may be new components or may be existing components in display device 218, e.g. a digital television (DTV) or in a set-top box (not shown). Additionally, while V-chip 210 is shown individually, it may be integrated into other components, such as display device 218.

Display system 200 also includes an optional flash memory device 214 coupled to bus 202 for providing V-chip settings. Flash memory device 214 can have removable flash memory components, e.g. SONY Memory Stick™. An optional user input device 213, e.g. a keypad, remote control, etc., coupled to bus 202, is also included in system 200 of FIG. 2A, to provide communication between display system 200 and a user. User input may be accommodated using existing buttons on a display device, e.g. device 218, or on a set top box (not shown).

Bus 202 provides an exemplary coupling configuration of devices in display system 200. Bus 202 is shown as a single bus line for clarity. However, it is appreciated by those skilled in the art that bus 202 can include subcomponents of specific data lines and/or control lines for the communication of commands and data between appropriate devices. It is further appreciated by those skilled in the art that bus 202 can be a parallel configuration, a serial configuration, or a "firewire" (IEEE 1394) configuration, and that bus 202 can include numerous gateways, interconnects, and translators, as appropriate for a given application.

It is also appreciated that on-site media system 200 is exemplary only and that the present invention can operate within a number of different display systems including a commercial media system, a general purpose computer system, etc. Furthermore, the present invention is well-suited to using a host of intelligent devices that have similar components as exemplary display system 200.

It is appreciated that computer system 200 is exemplary only and that the present invention can operate within a number of different computer systems including general purpose computer systems, embedded computer systems, and stand alone computer systems specially adapted for network operation. Furthermore, the present invention is well-suited to using a host of intelligent devices that have similar components as computer system 200. These intelligent devices can include a Digital Television (DTV), or other smart audio, video and data processing devices which have multiple processing components and memory blocks through which tasks may be executed.

Figure 2B:
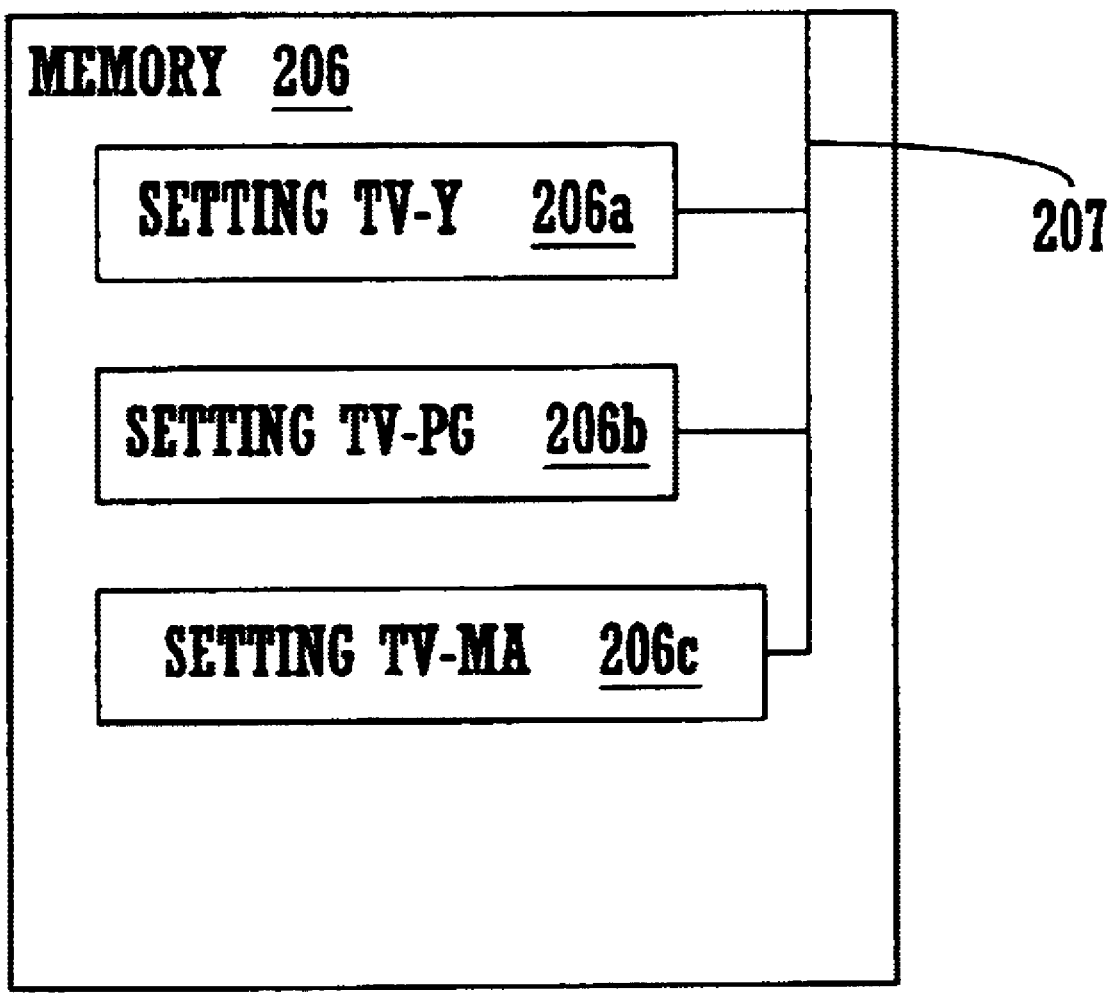
FIG. 2B is a block diagram of a memory component for implementing multiple V-chip settings, in accordance with one embodiment of the present invention.

Referring now to FIG. 2B, a block diagram of a memory component for implementing multiple V-chip settings is shown, in accordance with one embodiment of the present invention. Memory component 206 is shown with a plurality, e.g. three, of portions of memory for storing multiple, e.g. three, memory settings that are coupled together via line 207. Line 207 can subsequently be coupled to bus 202 of FIG. 2A. Setting TV-Y is stored in first portion 206a of memory 206. Setting TV-PG is stored in second portion 206b of memory 206. Setting TV-MA is stored in third portion 206c of memory 206. While the present embodiment shows three portions of memory, e.g. 206a–206c, the present invention is well-suited to using partitioning memory 206 to accommodate as many V-chip settings is desired. Similarly, while the present embodiment shows three with three specific V-chip settings, e.g. TV-Y, TV-PG, TV-MA, the present invention is well-suited to storing any specific V-chip setting. In one embodiment, V-chip settings are stored in a configuration of memory that can retain data without power. Thus, for example, the memory may be stored in a hard drive, flash memory, electronically erasable programmable read only memory (EEPROM), and the like.

Figure 2C:
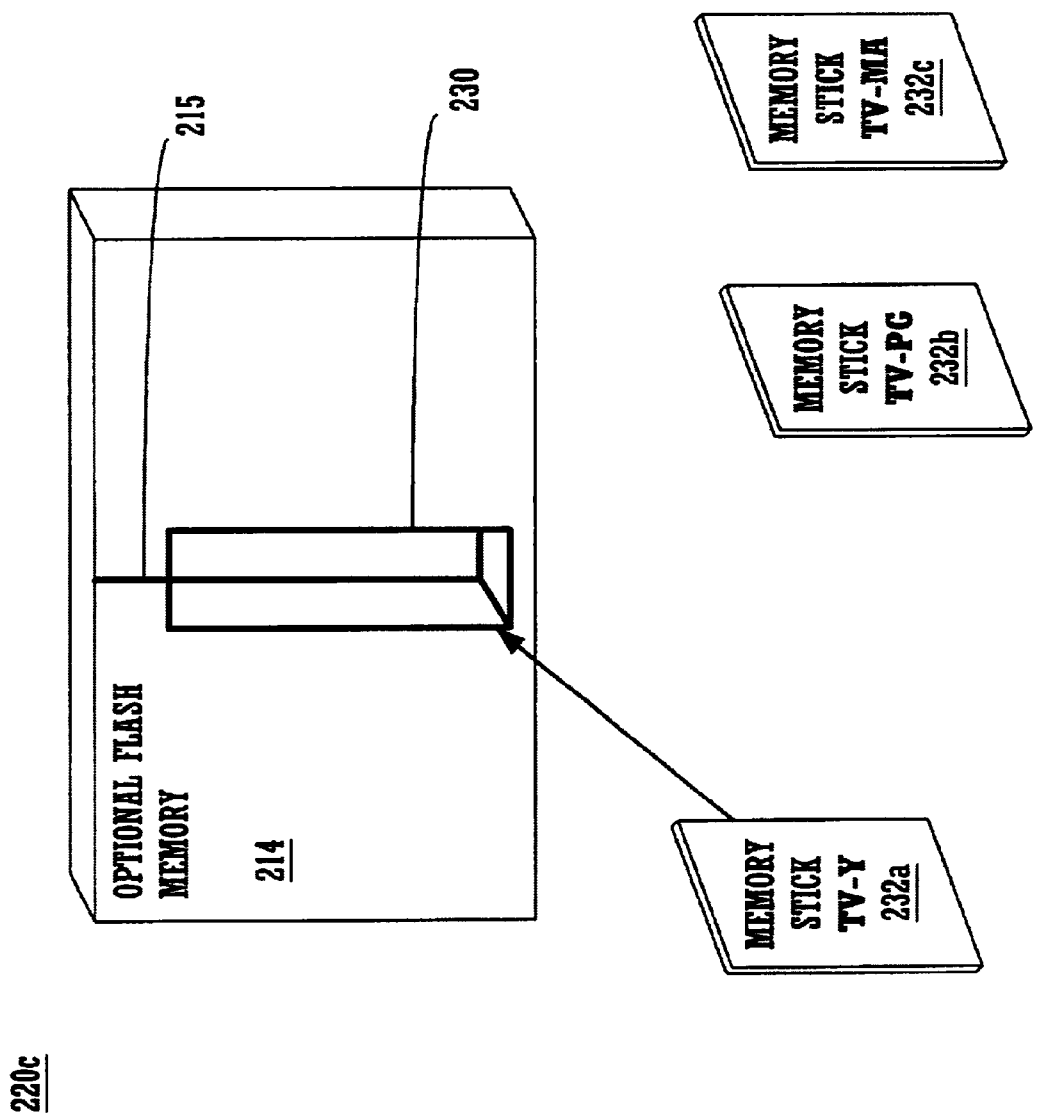
FIG. 2C is a block diagram of a flash memory device for implementing multiple V-chip settings, in accordance with one embodiment of the present invention.

Referring now to FIG. 2C, a block diagram of a flash memory device for implementing multiple V-chip settings is shown, in accordance with one embodiment of the present invention. FIG. 2C provides one embodiment of optional flash memory device 214 shown in FIG. 2A. Optional flash memory device 214 includes an adapter 230 coupled to line 215 that can, in turn, be coupled to bus 202 of FIG. 2A. Optional flash memory device 214 also includes a removable memory card, e.g. memory card 232a. Removable flash memory card 232a is a SONY Memory Stick™ configuration in the present embodiment. However, flash memory device 214 is well-suited to using a wide range of removable memory components and configurations. FIG. 2C shows interchangeable flash memory cards including memory stick G 232a, PG 2342b, and TV-MA 232c. Memory stick TV-Y 232a provides a "TV-Y rating" V-chip setting for a display device. Similarly, memory stick TV-PG 2342b, provides a "TV-PG rating" V-chip setting for a display device. Finally, memory stick TV-MA 232c provides a "TV-MA rating" V-chip setting for a display device. Because of the flexibility of flash memory, any of the flash memory cards shown can be reprogrammed to a wide range of V-chip settings. While FIG. 2C shows three flash memory cards with specific V-chip settings, the present invention is well-suited to using any number of flash memory cards with any type of V-chip setting.

Figure 3:
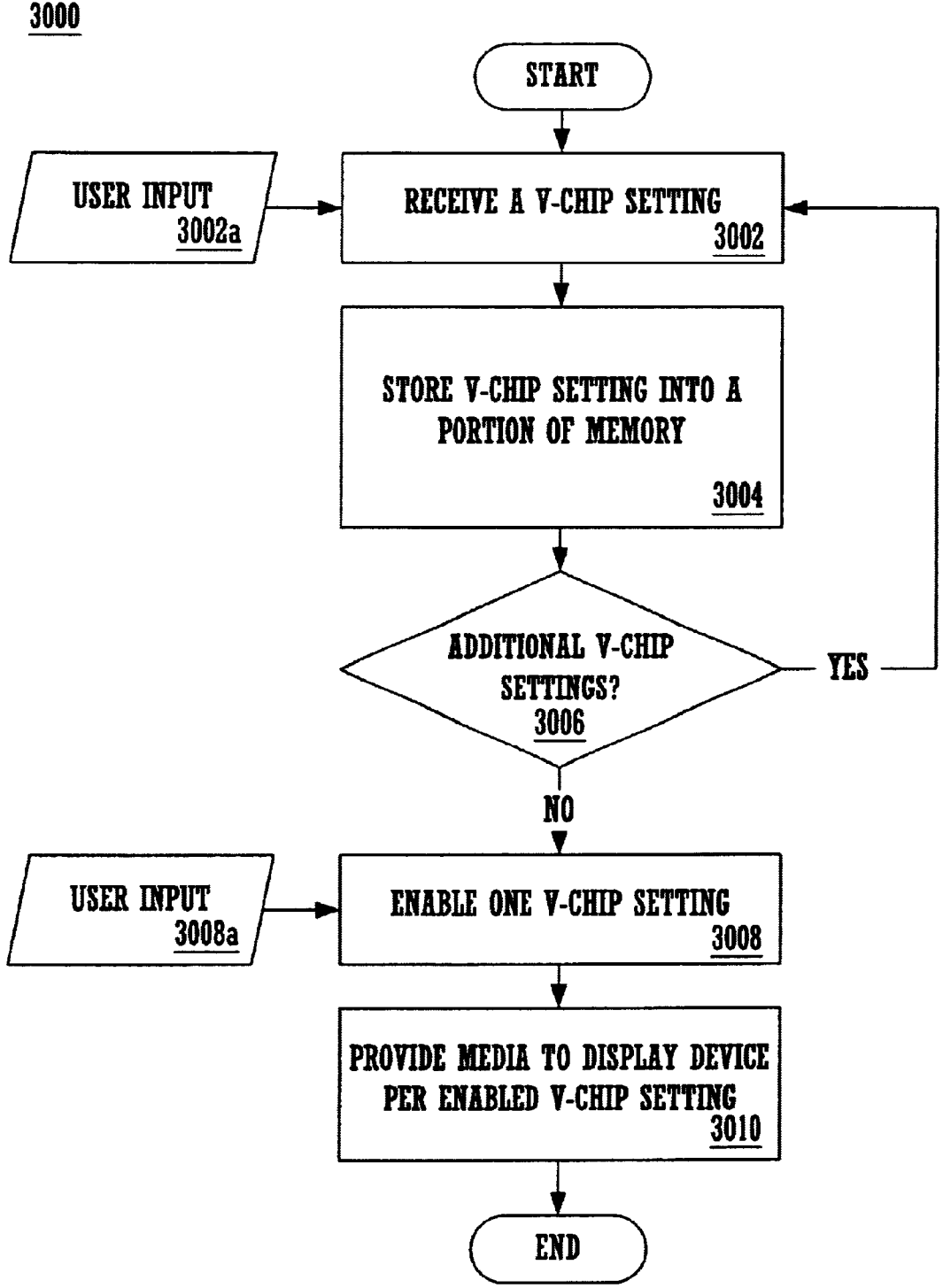
FIG. 3 is a flowchart of the process performed to implement multiple V-chip settings for a display system, in accordance with one embodiment of the present invention.

Referring now to FIG. 3, a flowchart of the process 3000 performed to implement multiple V-chip settings for a display system, in accordance with one embodiment of the present invention. By using the process 3000 embodiment of the present invention, multiple V-chip settings can be efficiently and consistently implemented for a display device. Furthermore, process 3000 embodiment of the present invention eliminates the need to constantly reprogram the V-chip setting each time the viewer category changes. While process 3000 embodiment of the present invention is implemented using display system 200, the present invention is well-suited may be implemented in a wide variety of media systems or components, as mentioned for FIG. 2A.

Process 3000 begins with step 3002. In step 3002 of the present embodiment, a V-chip setting is received. Step 3002 is implemented, in one embodiment, by computer system 200 shown in FIG. 2A. In particular, a user may provide input 3002a for a V-chip setting via optional user input device 213 of FIG. 2A. However, the present invention is well-suited to using a wide range of devices and paradigms for receiving input data for V-chip settings.

Figure 4:
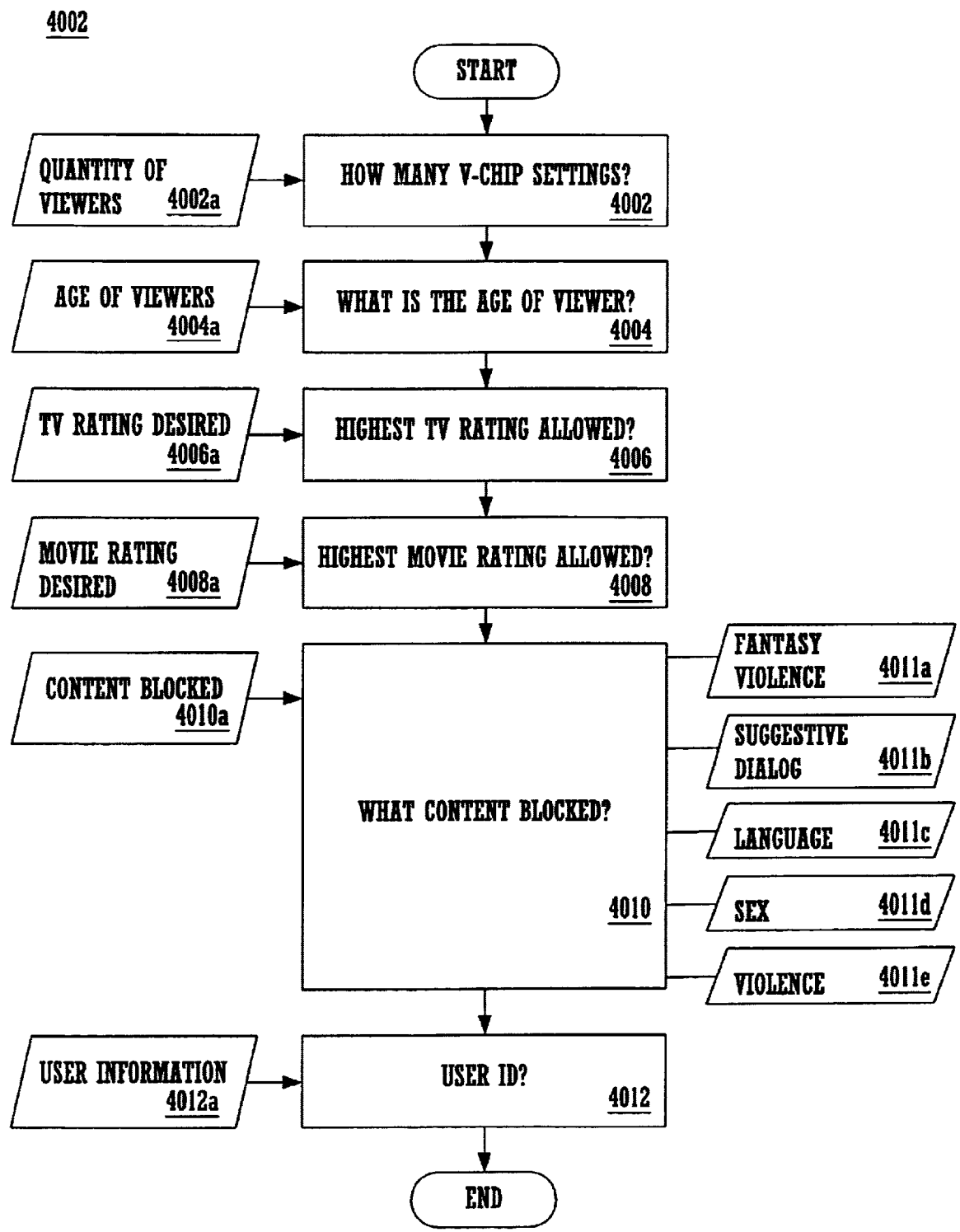
FIG. 4 is a flowchart of the process performed to receive one of multiple V-chip settings, in accordance with one embodiment of the present invention.

In one embodiment of step 3002, a person responsible for the viewing patterns of the multiple viewers provides the V-chip settings for all the viewers. More specifically, V-chip settings can be obtained, in one embodiment, via graphical user interfaces (GUI) that are provided to the viewer. The GUI can be user driven or program driven, it can include options, and it can use a wide variety of methods to determine the portion of media that gets blocked by the V-chip. Subsequent FIG. 4 provides one embodiment that implements step 3002 more explicitly. In lieu of the user providing the multiple V-chip settings, memory with a pre-formatted V-chip setting memory may be created by a commercial manufacturer and sold to a viewer. Following step 3002, process 3000 proceeds to step 3004.

In step 3004 of the present embodiment, the V-chip setting is stored into a portion of memory. Step 3004 is implemented, in one embodiment, by computer system 200 shown in FIG. 2A. That is, the V-chip setting received in step 3002 can be stored into internal memory portion 206 of display system 200 of FIG. 2A. Also, FIGS. 2B and 2C provide more specific embodiments implementing step 3004. That is, FIG. 2B can provide a portion of memory 206 for storing V-chip setting. For example, first V-chip setting for a "TV-Y" programming, received in step 3002, can be stored in first portion 260a of memory 206 as shown in FIG. 2B. Alternatively, first V-chip setting for a "TV-Y" programming, received in step 3002, can be stored in one memory stick, e.g. memory stick 232a, as shown in FIG. 2C. In this manner, the present invention provides a mechanism for retaining multiple-chip settings. Consequently, the present invention eliminates the need to reprogram a V-chip setting for different viewer categories. Following step 3004, process 3000 proceeds to step 3006.

In step 3006 of the present embodiment, an inquiry determines whether additional V-chip settings are desired. If additional V-chip settings are desired, then process 3000 returns to step 3002. However, if additional V-chip settings are not desired, then process 3000 proceeds to step 3008. Step 3006 allows the present invention to receive and retain multiple V-chip settings in parallel. In comparison, the prior art could only receive one V-chip setting at a time. Thus the prior art method requiring reprogramming of the V-chip setting for a different viewer category. Thus, the present invention overcomes the inefficiency and frustration associated with the prior art method of V-chip settings for multiple viewer categories on the same display device.

The multiple V-chip settings achieved using steps 3002–3006 are accommodated by providing additional portions of memory in which to store the V-chip settings. For example, one embodiment of the present invention provides additional portions of non-volatile memory 206, as shown in FIG. 2B, to accommodate additional V-chip settings. While FIG. 2B shows three V-chip settings that accommodate three portions of memory, e.g. 206a, 206b, and 206c for each respective V-chip setting, the present invention is well-suited to any number of V-chip settings, per available memory space. Alternatively, FIG. 2C shows how multiple V-chip settings are provided by physically storing them on individual flash memory cards, e.g. memory card 232a, 232b, and 232c. Consequently, the present invention provides a method and apparatus for accommodating multiple V-chip settings for a single display device.

Step 3008 arises if no additional V-chip settings are desired. In step 3008 of the present embodiment, one V-chip setting is enabled. Step 3008 is implemented, in one embodiment, by computer system 200 shown in FIG. 2A. In one embodiment, a default V-chip setting provides no V-chip filtering. In another embodiment, a default V-chip setting can be programmed into the display device 200 of FIG. 2A by the user. In this manner, the television programming will always be available for viewing on the most benign setting. In another embodiment, user input, e.g. input 3008a, can enable the desired V-chip setting from the multiple V-chip settings available. That is, input 3008a may be achieved, in one embodiment, by using an optional user input device, e.g. device 213 of FIG. 2A, to select the V-chip setting desired from the multiple V-chip settings available in memory. Thus, a user input may select setting TV-PG 206b from memory 206 of FIG. 2B by using a remote control device to enable this setting via a graphical user interface. The present invention is well-suited to using the alternatives mentioned in FIG. 2A for the user input device.

The user input may also require a password, as part of user input 3008a, to select from some of the more explicit V-chip settings. For example, a parent or guardian may program a password, e.g. "12345," along with a V-chip setting, e.g. TV-MA for mature audience, in step 3002. By using a password, children will not be able to accidentally select the protected V-chip setting, e.g. TV-MA, when they desire to watch television.

Alternatively, user input 3008a may also be implemented in a more physical fashion. For example, V-chip settings may be controlled by a physical memory with V-chip settings, such as the embodiment shown in FIG. 2C. Multiple memory sticks, e.g. memory stick 232a–232c, can have different V-chip settings as appropriate for an individual. In this embodiment, a child may be given memory stick G 232a, while a teenager in the household receives memory stick PG 232b. Memory stick TV-MA, 232c can be kept by the parents. In this manner, V-chip settings are controlled by the physical possession of the flash memory cards. Thus, user input for a child would constitute the act of coupling the insertion of memory component 232a into optional flash memory device 214, as shown in FIG. 2C. In one embodiment, the memory stick cards can also be adapted to have user input passwords that will enable them. The passwords can be stored in the flash card itself, e.g. flash card 232a, or in internal memory, e.g. memory 206 of FIG. 2A. Following step 3008, process 3000 proceeds to step 3010.

In step 3010 of the present embodiment, media is provided to display device according to the enabled V-chip setting. Step 3010 is implemented, in one embodiment, by computer system 200 shown in FIG. 2A. The V-chip and its function are well-known in the art. Consequently, discussion of the V-chip is omitted herein for purposes of clarity. Step 3010 can include a sub-step of recording the title, or the content, of the programs that are actually viewed. This information can subsequently be made available to the person responsible for setting or monitoring the V-chip settings for a particular household. In this manner, the performance of the V-chip settings can be reviewed and screened. Following step 3010, process 3000 ends.

Referring now to FIG. 4, a flowchart of the process to receive one of multiple V-chip settings, in accordance with one embodiment of the present invention. By using the process 4000 embodiment of the present invention, multiple V-chip settings can be easily and quickly implemented for a display device. While process 4000 embodiment of the present invention is implemented using display system 200, the present invention is well-suited may be implemented in a wide variety of media systems or components. In particular, process 4000 utilizes user input via optional user input device 213 to program V-chip settings in memory, e.g. memory 206 of FIG. 2A or memory sticks 232*a*–232*c* of FIG. 2C, in the present embodiment. Process 4000 is well-suited to the alternatives mentioned for these figures.

Process 4000 begins with step 4002. In step 4002 of the present embodiment, a query requests how many V-chip settings are desired. Input 4002*a* conveys the quantity of viewer categories desired. Thus, for example, a parent may input a value of "three" for input 4002*a* to represent the desired quantify of viewer categories, e.g. one setting for a child, one for a teenager, and one for an adult. This quantity of settings may be utilized, in one embodiment, in step 3006 of FIG. 3 for determining the repetition of other GUI menus. Subsequent steps 4004–4012 are applicable to a single V-chip setting. These steps may be repeated for as many V-chip settings as are desired, as dictated per input 4002*a*. Note that a single V-chip setting can accommodate multiple viewers. Thus, for example, if a family has three young children, they can all be accommodated on the V-chip setting programmed for a child. Step 4002 is implemented, in one embodiment, by the first GUI 600*a* shown in FIG. 6A. Following step 4002, process 4000 proceeds to step 4004.

In step 4004 of the present embodiment, a query requests the age of a viewer. Input 4004*a* conveys the age of the viewer. Thus, for example, a parent may input a value of "six" as input 4004*a* to represent the age of the first viewer, e.g. for the child. Step 4004 is implemented, in one embodiment, by the second GUI 600*b* shown in FIG. 6B. Following step 4004, process 4000 proceeds to step 4006.

In step 4006 of the present embodiment, a query requests the highest TV rating allowed for the given viewer. Input 4006*a* conveys the user input for the highest TV rating desired for the given viewer, e.g. for the child. Thus, for example, a parent may input a value of "TV-G" as input 4006*a* as the highest TV rating desired for the first viewer, e.g. for the child. TV ratings can be provided by any one of a number of sources, such as the U.S. Federal Communications Commission (FCC) regulations. Step 4006 is implemented, in one embodiment, by the third GUI 600*c* shown in FIG. 6C. Following step 4006, process 4000 proceeds to step 4008.

In step 4008 of the present embodiment, a query requests the highest movie rating allowed for the given viewer. Input 4008*a* conveys the user input for the highest movie rating desired for the given viewer, e.g. for the child. Movie ratings can be provided by any one of a number of sources, such as the Movie Producers Accrediting Association (MPAA). Thus, for example, a parent may input a value of "G" as input 4004*a* as the highest movie rating desired for the first viewer, e.g. for the child. Step 4008 is implemented, in one embodiment, by the fourth GUI 600*d* shown in FIG. 6D. Following step 4008, process 4000 proceeds to step 4010.

In step 4010 of the present embodiment, a query requests what content should be blocked for the given viewer. Input 4010*a* conveys the user input for the content desired to be blocked for the given viewer, e.g. for the child. A GUI can provide options available for the query of step 4010. For example, menu selections for the present embodiment can include: fantasy violence 4011*a*, suggestive dialogue (D) 4011*b*, language (L) 4011*c*, sex (S) 4011*d*, violence (V) 4011*e*. Thus, for example, a parent may convey, via input 4010*a*, a desire to block media content having "fantasy violence," "suggestive dialogue," "language," "sex," "violence," for the first viewer, e.g. for the child. Step 4010 and input 4010*a* can be used in addition to, or in lieu of predetermined filter settings for TV and movies from steps 4006 and 4008. For example, content levels can be utilized for filtering unrated media such as sports, public service announcements, and advertising. Step 4010 is implemented, in one embodiment, by the fifth GUI 600*e* shown in FIG. 6E. Following step 4010, process 4000 proceeds to step 4012.

In lieu of a user selecting the specific TV ratings per step 4006, the specific movie ratings per step 4008, or the specific content per step 4010, the present invention is well-suited to using a matrix of simplified ratings. That is, a predetermined interface can provides automatic selection of the appropriate content according to some other category. For example, an interface can provide a simple age category for which a user may program a V-chip setting. In one embodiment, such an age category can include entries such as child, youth, young adult, or adult. By using simplified rating system, the present invention can provide a very user-friendly menu selection that would be compatible with the many different standards of media ratings that exist.

In particular, a simplified rating level can provide an interface between the different standards between the United States, Canada, Europe, etc. A portion of the different media standards are provided in the Electronic Industries Association (EIA) documents, such as EIA-608 and EIA-744-A, which are incorporated herein by reference. For example, a user can select a V-chip setting for a young adult category in the universal interface, and the same setting could successfully filter media provided by the diverse standards mentioned. Table 1.1 provides one embodiment of such a simplified rating level interface. The menu interface would provide the viewer with a simple category for selecting the allowable type of media to be shown. As an example, this "User-Selectable Category" could include entries such as "child," "youth," "young adult," and "adult." The young adult entry would automatically filter out the appropriate media regardless of the standard or country's rating system. Thus, for example, if a user selected a "young adult" setting, it would only allow media rated by U.S. standards at TV-14, Movie PG, or lower to be viewed. Similarly, the same setting would also only allow media rated by Canadian English language standard at PG or lower, or media rated by Canadian French language standard at 16 ans+ or lower, to be viewed. The present embodiment only provides one example of many different configurations possible with a universal interface.

TABLE 1.1

Simplified Rating Levels for V-chip

| User-Selectable Categoy | US TV-Movie Ratings | Canadian TV-Movie Ratings | Canadian French | Content |
|---|---|---|---|---|
| child | TV-Y, Movie G | C | G | — |
| youth | TV-Y7, Movie G | C | 8 ans + | Fantasy Violtence |
| young adult | TV-14, Movie PG | PG | 16 ans + | Dialog, Language, Sex, Violence |
| adult | TV-MA, Movie R | 18+ | 16 ans + | Dialog, Language, Sexual, Violence |

In step 4012 of the present embodiment, a query requests a user identification (ID). Input 4012a conveys the user input for the ID for the given viewer, e.g. for the child. Thus, for example, a parent may input a value of "12345" as input 4012a for the first viewer, e.g. for the child. The user ID can be utilized as a password to be entered for a given viewer to select their V-chip setting. In this manner, a child could be protected from accidentally selecting the parent's V-chip setting as the child would not have knowledge of the parent's user ID, or password. The present invention is well-suited to using any length of password for the user ID. Naturally, a longer length password increases the number of possible combinations, and thus provides greater hack-proofing. The user ID can also benefit from telephone keypad letter/number association to spell a users name, e.g. "John" is "5646." Following step 4012, process 4000 ends.

While process 4000 of the present embodiment shows a specific sequence and quantity of steps, the present invention is suitable to alternative embodiments. For example, not all the steps provided for process 4000 are required for the present invention. For example, the age of the viewer in step 4004 can be omitted. Furthermore, additional steps can be added to the steps shown for the present embodiment. Likewise, the sequence of the steps can be modified depending upon the application. While process 4000 is shown as a single serial process, it can also be implemented as a continuous or parallel process.

Many of the instructions for the steps, and the data input and output from the steps of process 4000 is implemented utilizing memory 206 and utilizing processor 204 shown in FIG. 2A. Memory storage 206 of the present embodiment can either be permanent, such as read only memory (ROM) 206b, or temporary memory such as random access memory (RAM) 206a. Memory 206 can also be any other type of memory storage, capable of containing program instructions, such as a hard drive, a CD ROM, or flash memory. Furthermore, processor 204 can either be a dedicated controller, an existing system processor, or it can be a dedicated digital signal processing (DSP) processor. Alternatively, the instructions can be implemented using some form of a state machine.

Figure 5A:
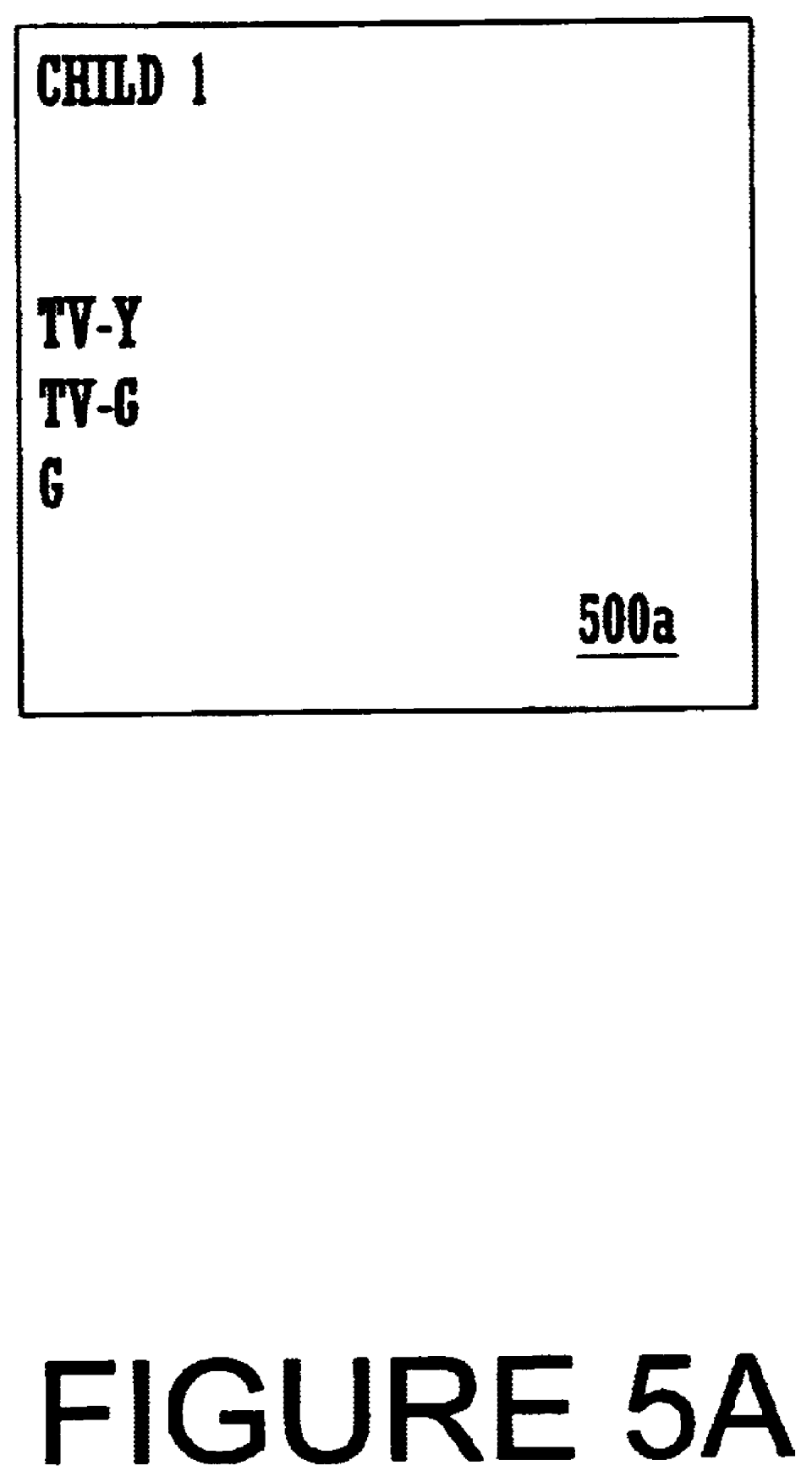

Referring now to FIG. 5A, a V-chip setting scenario 500a for a first child is shown, in accordance with one embodiment of the present invention. In particular, the first child is 6 years old in this scenario, with a V-chip setting of TV-Y, TV-G as the maximum allowed TV rating, and a V-chip setting of G as the maximum allowed movie rating.

Figure 5B:
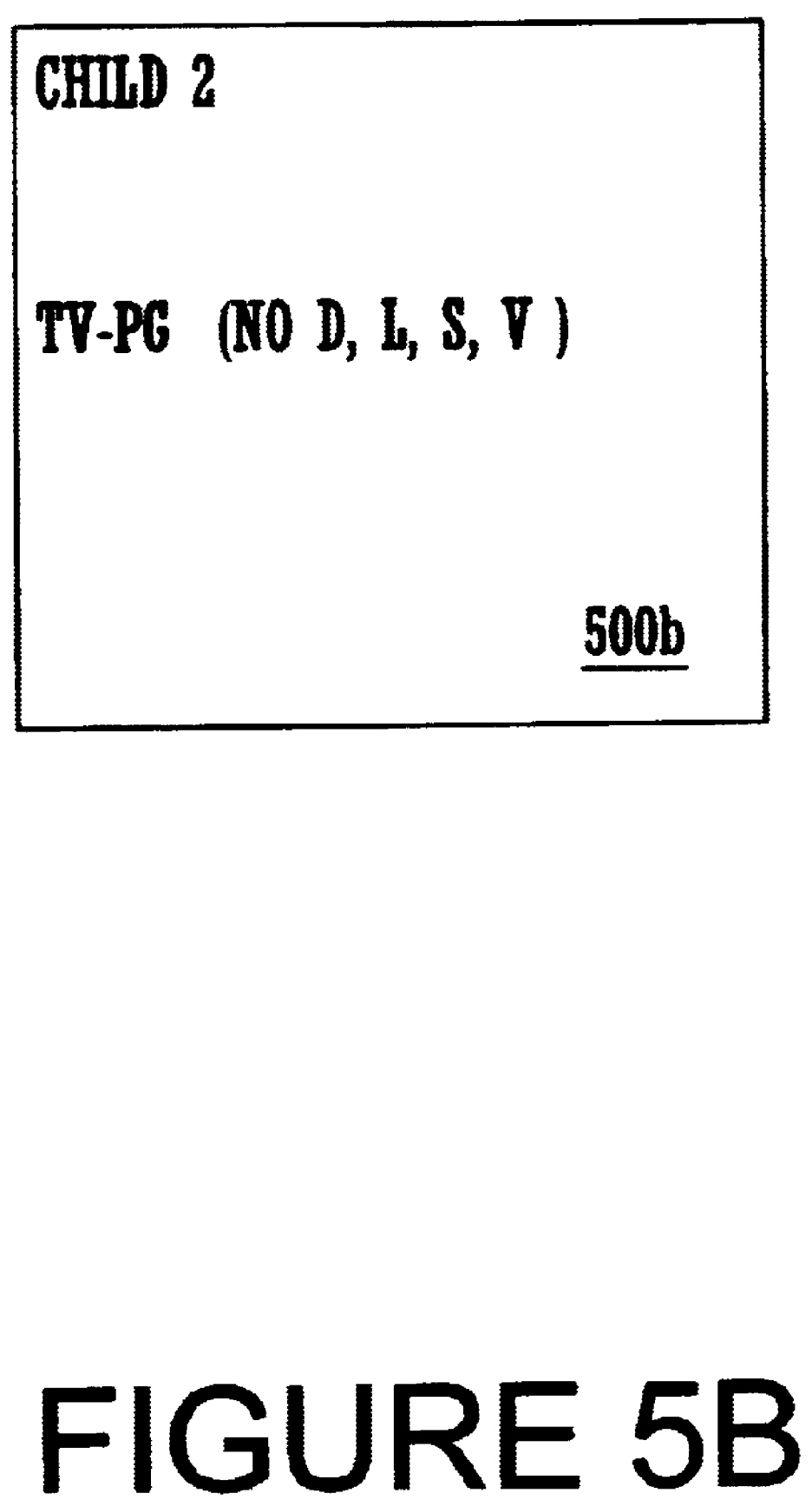

Referring now to FIG. 5B, a V-chip setting scenario 500b for a second child is shown, in accordance with one embodiment of the present invention. In particular, the second child is 10 years old in this scenario, with a V-chip setting of TV-PG (with no dialogue, language, sex, or violence content) as the maximum allowed TV rating, and a V-chip setting of G as the maximum allowed movie rating.

Figure 5C:
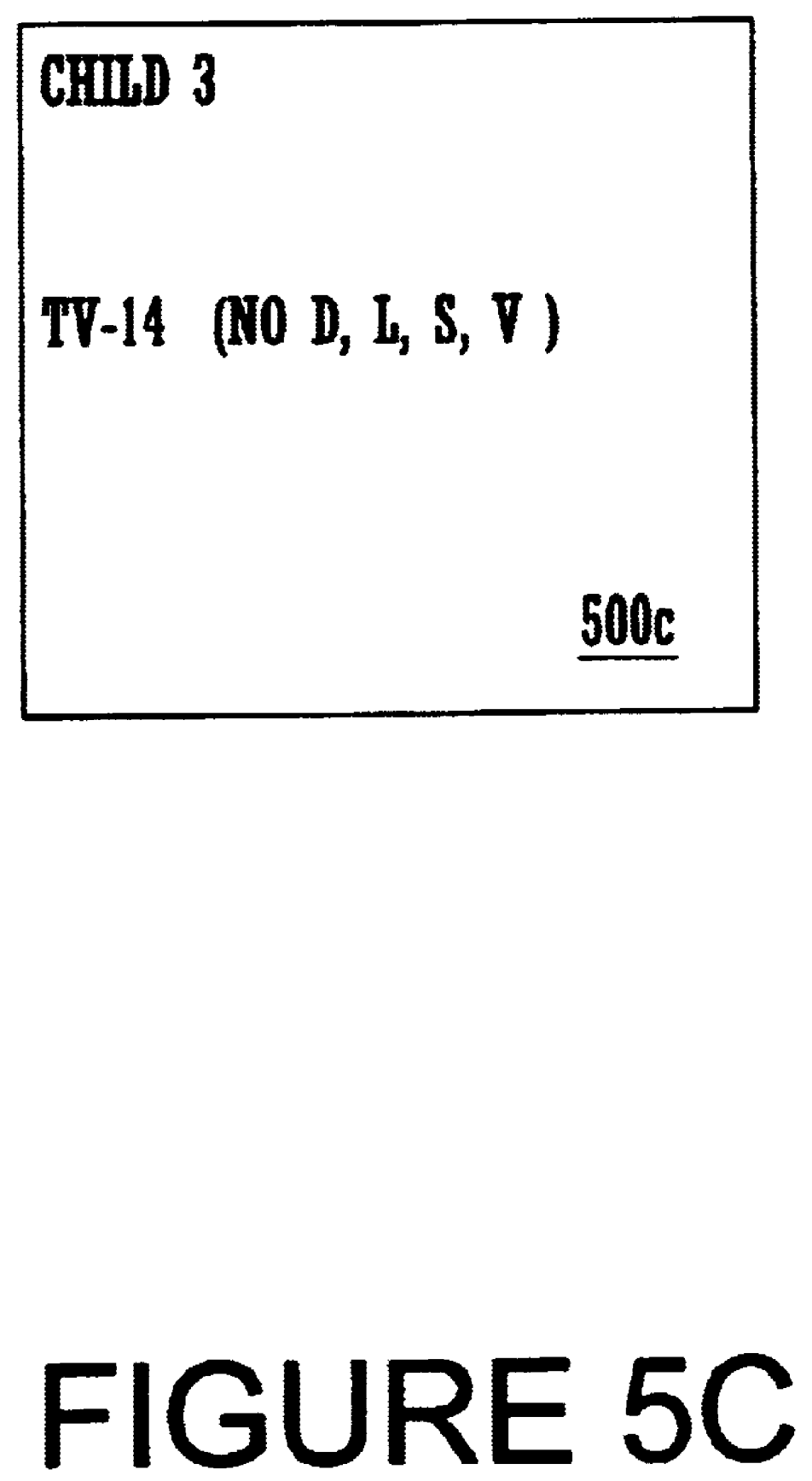

Referring now to FIG. 5C, a V-chip setting scenario 500c for a third child is shown, in accordance with one embodiment of the present invention. In particular, the third child is 15 years old in this scenario, with a V-chip setting of TV-14 (with no dialogue, language, sex, or violence content) as the maximum allowed TV rating, and a V-chip setting of PG as the maximum allowed movie rating. While the present embodiments have provided three specific scenarios for content and for TV and movie ratings for the V-chip, the present invention is well-suited to any combination of content and ratings.

FIGS. 6A–6F provide embodiments of a graphical user interface (GUI) that can be used for entering a V-chip setting. A user can provide an input to the GUI via an optional user input device, e.g. block 212 of FIG. 2A. In one embodiment, the user input device is a remote control unit. However, the present invention is well-suited to receiving user input from a wide variety of input devices and methods. While FIGS. 6A–6F provide specific queries and responses, the present invention is well-suited to using any quantity of GUIs having any query appropriate for providing a V-chip setting. The user input to a GUI is displayed in the GUI, in the present invention. The present invention is well-suited to using many different methods of confirming the user input. Displaying the user input confirms the value provide and thus, helps to reduce errors and improve reliability of attaining the desired V-chip setting.

Figure 6A:
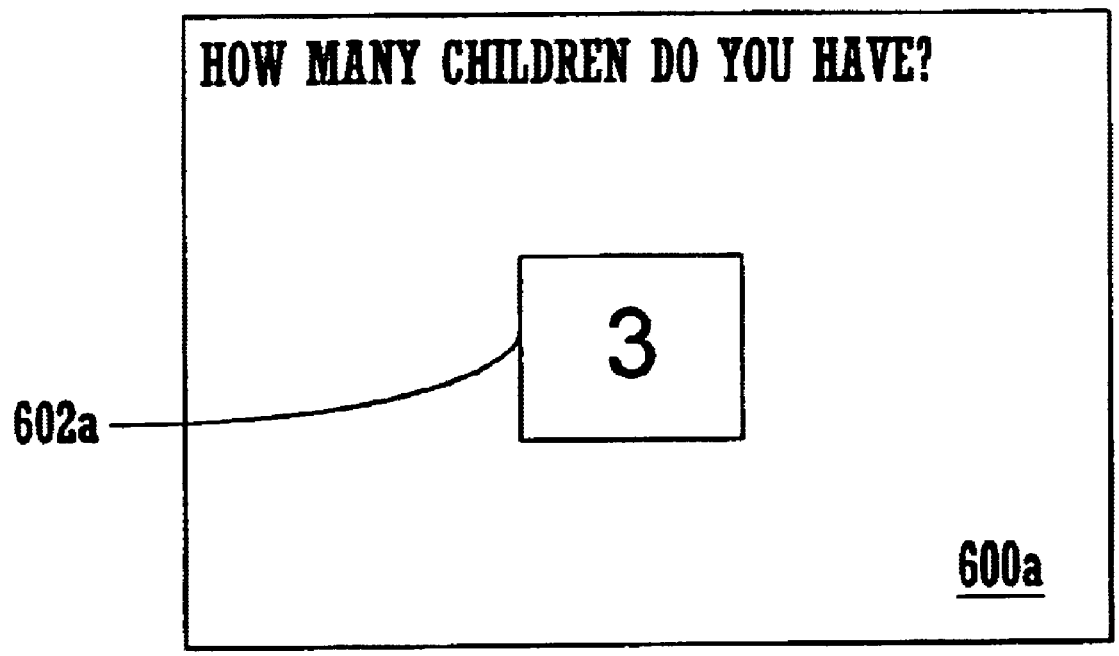
FIG. 6A is a first graphical user interface (GUI) for entering a V-chip setting, in accordance with one embodiment of the present invention.

Referring now to FIG. 6A, a first graphical user interface (GUI) for entering a V-chip setting is shown, in accordance with one embodiment of the present invention. First GUI 600a provides the query: "How many children do you have?" In the present embodiment, the viewer has input a value of three (3) for the number of children. This response is displayed in a portion 602a of GUI that displays the viewer's input.

Figure 6B:
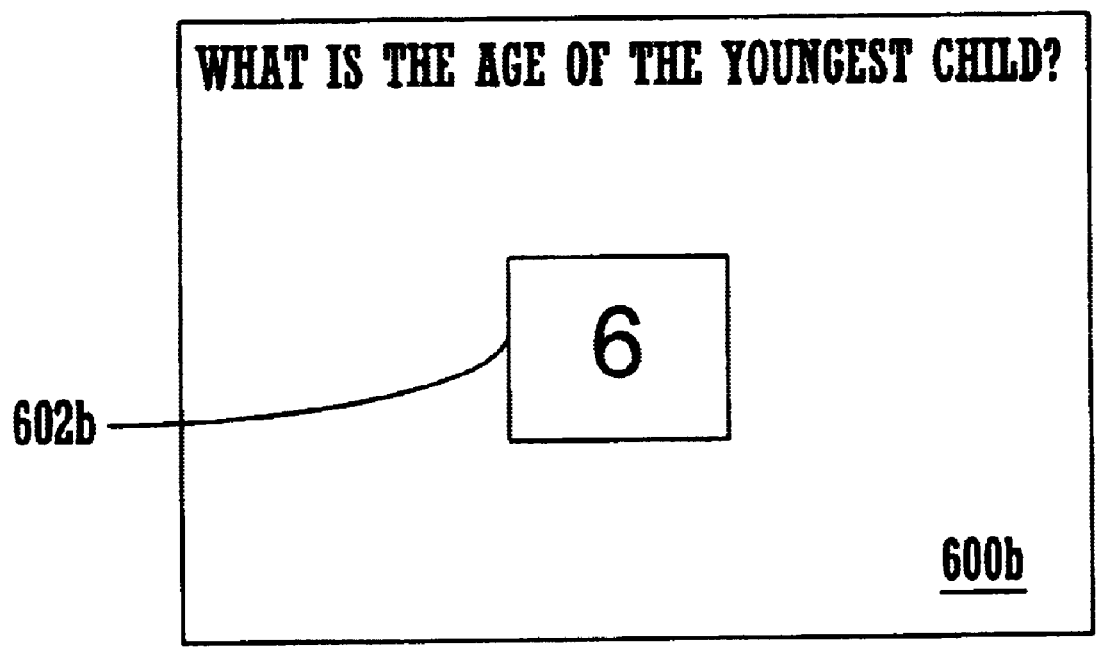
FIG. 6B is a second graphical user interface (GUI) for entering a V-chip setting, in accordance with one embodiment of the present invention.

Referring now to FIG. 6B, a second graphical user interface (GUI) for entering a V-chip setting is shown, in accordance with one embodiment of the present invention. Second GUI 600b provides the query: "What is the age of the youngest child?" In the present embodiment, the viewer has input a value of six (6) for the age of the youngest child. This response corresponds to the first child setting desired, as shown in FIG. 5A. This response is shown in a portion 602b of GUI that displays the viewer's input.

Figure 6C:
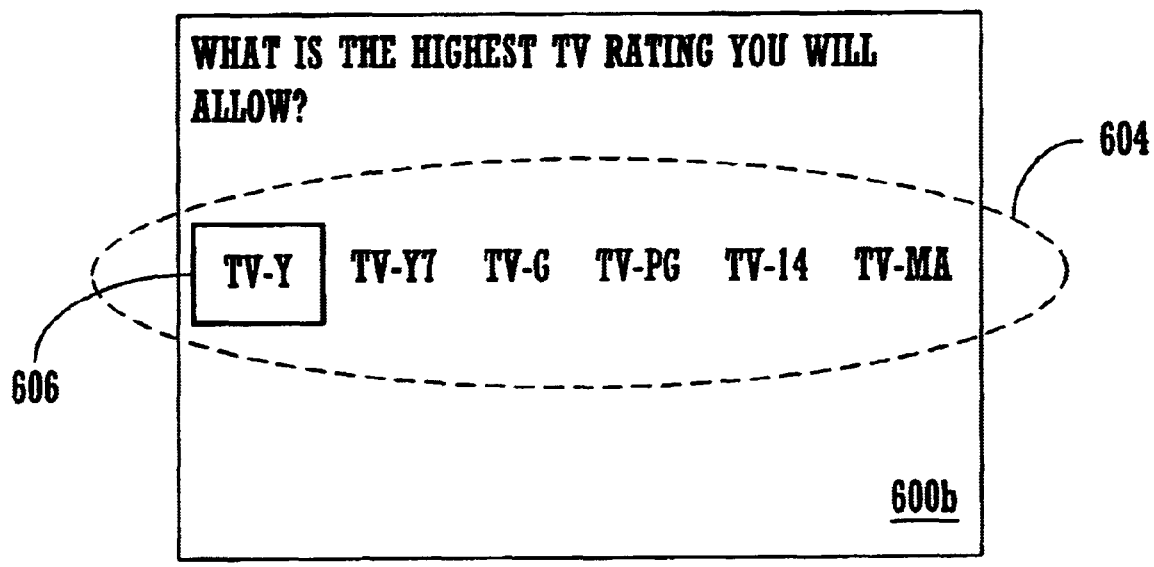
FIG. 6C is a third graphical user interface (GUI) for entering a V-chip setting, in accordance with one embodiment of the present invention.

Referring now to FIG. 6C, a third graphical user interface (GUI) for entering a V-chip setting is shown, in accordance with one embodiment of the present invention. Third GUI 600c provides the query: "What is the highest TV rating you will allow?" Third GUI 600c also provides a list 604 of available options. In this manner, the present GUI is menu driven, only allowing an input from the provided list. In the present embodiment, the viewer has input a value of TV-Y, for the highest TV rating. This response is highlighted by bolding the chosen value, and by enclosing the chosen value in a box 606.

Figure 6D:
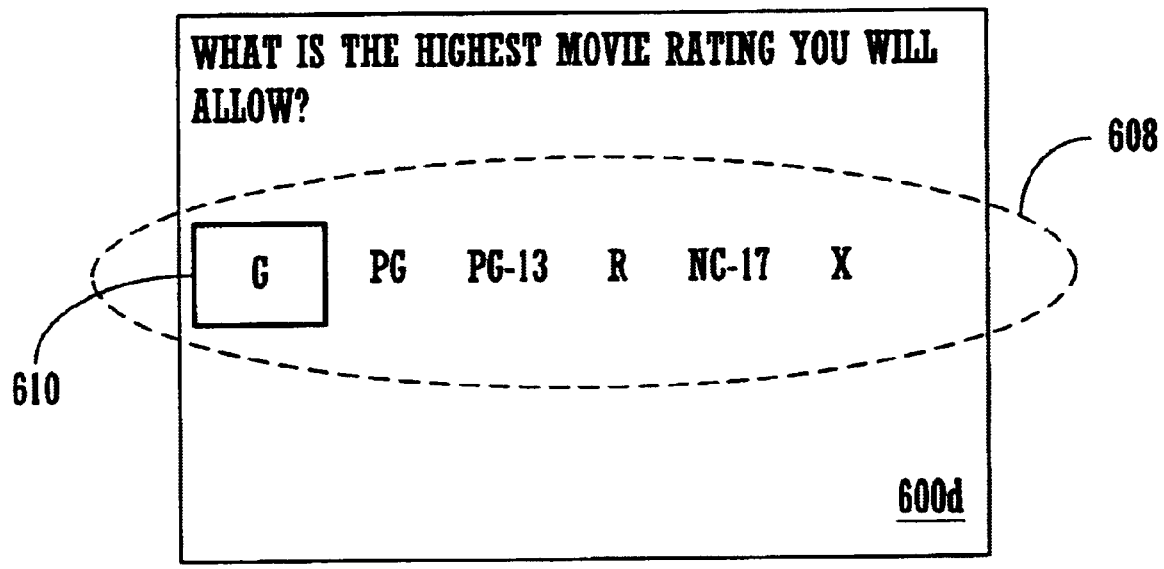
FIG. 6D is a fourth graphical user interface (GUI) for entering a V-chip setting, in accordance with one embodiment of the present invention.

Referring now to FIG. 6D, a fourth graphical user interface (GUI) for entering a V-chip setting is shown, in accordance with one embodiment of the present invention. Fourth GUI 600d provides the query: "What is the highest movie rating you will allow?" Fourth GUI 600d also provides a list 608 of available options. In this manner, the present GUI is menu driven, only allowing an input from the provided list. In the present embodiment, the viewer has input a value of G, for the highest movie rating.

This response is highlighted by bolding the chosen value, and by enclosing the chosen value in a box 610.

Figure 6E:
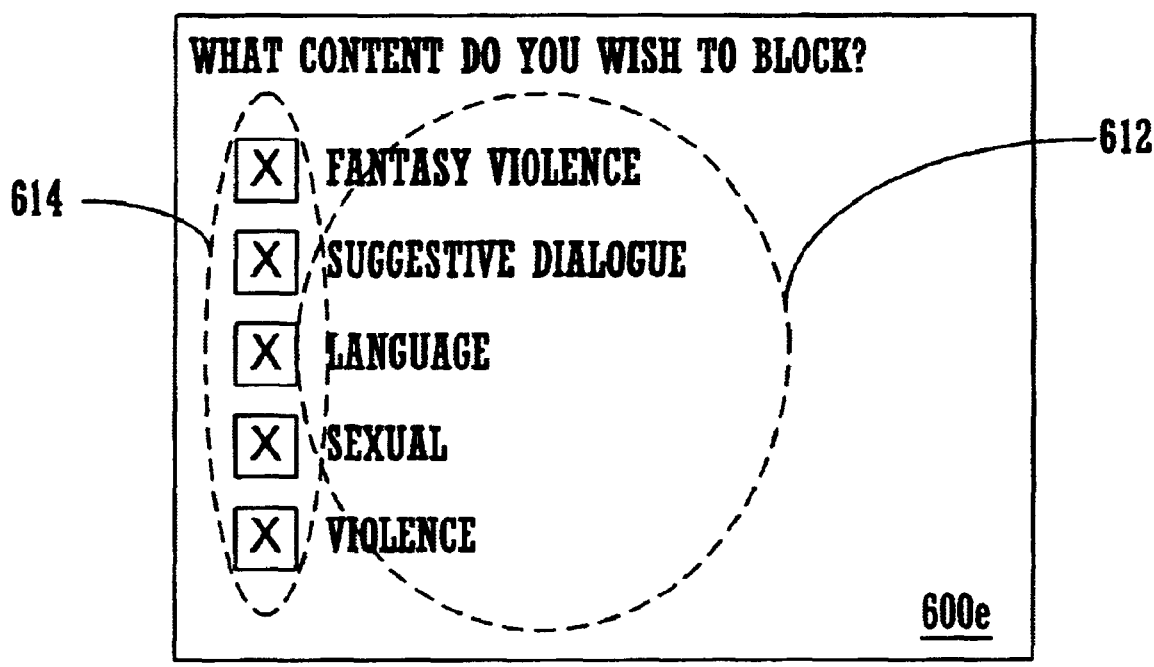
FIG. 6E is a fifth graphical user interface (GUI) for entering a V-chip setting, in accordance with one embodiment of the present invention.

Referring now to FIG. 6E, a fifth graphical user interface (GUI) for entering a V-chip setting is shown, in accordance with one embodiment of the present invention.

Fifth GUI 600e provides the query: "What content do you wish to block?" Fifth GUI 600e also provides a list 612 of available options. In this manner, the present GUI is menu driven, only allowing an input from the provided list. In the present embodiment, the viewer has input a value of Fantasy Violence (FV), Suggestive Diaglogue (D), Language (L), Sexual (S), and Violence (V), for the content to be blocked. This response is indicated by providing a check mark in boxes 614 that correspond to the entries chosen.

Figure 6F:
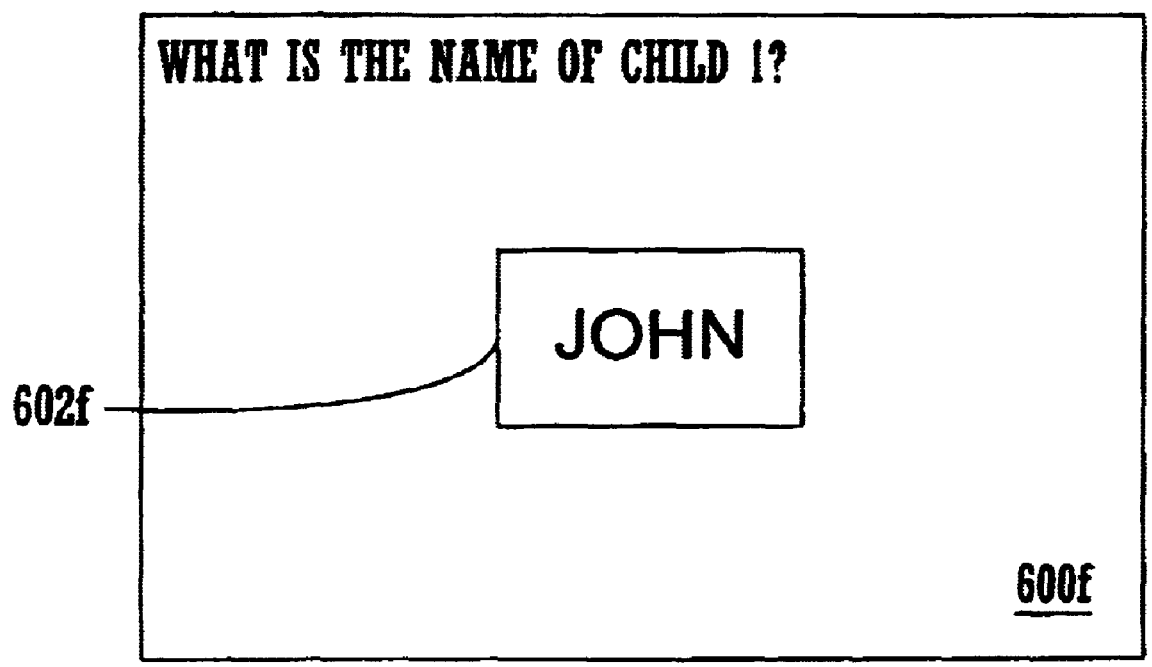
FIG. 6F is a sixth graphical user interface (GUI) for entering a V-chip setting, in accordance with one embodiment of the present invention.

Referring now to FIG. 6F, a sixth graphical user interface (GUI) for entering a V-chip setting is shown, in accordance with one embodiment of the present invention.

Sixth GUI 600f provides the query: "What is the name of child 1?" In the present embodiment, the viewer has input a value "John" for the name of child 1. This response is shown in a portion 602f of GUI that displays the viewer's input.

Referring now to FIG. 6G, a seventh graphical user interface (GUI) for entering a V-chip setting is shown, in accordance with one embodiment of the present invention. Seventh GUI 600g provides recap of all the user provided inputs. Thus, GUI 600g shows TV ratings of "TV-Y and TV-G," a movie rating of "G," and "No contents allowed." A final GUI input can be provided to save the setting. In the present embodiment, the input is pressing the "+" key on a remote control keypad.

Figure 7A:
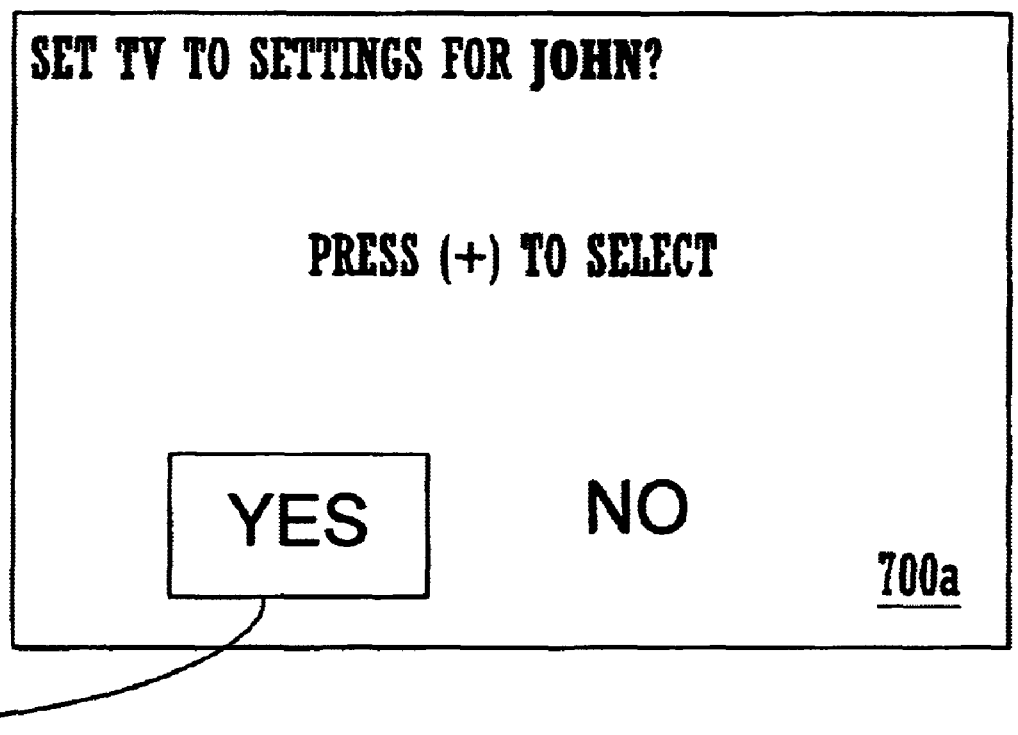
FIG. 7A is a first graphical user interface (GUI) for enabling a V-chip setting, in accordance with one embodiment of the present invention.

Referring now to FIG. 7A, a first graphical user interface (GUI) for enabling a V-chip setting is shown, in accordance with one embodiment of the present invention. First GUI 700a for enabling a V-chip setting provides the query: "Set TV to settings for JOHN?" First GUI 700a also provides instructions for selecting the value, e.g. by pressing the "+" key on a remote control keypad. The user input is also highlighted and enclosed in a box 702 to confirm the desired instruction. First GUI 700a can be provided in response to the insertion of a flash memory card, e.g. card 232a into optional flash memory device 214, as shown in FIG. 3C. Alternatively, first GUI 700a can be provided in response to a viewer calling up a V-chip setting from internal memory, e.g. first portion of memory 206a of memory 206, as shown in FIG. 2B.

Figure 7B:
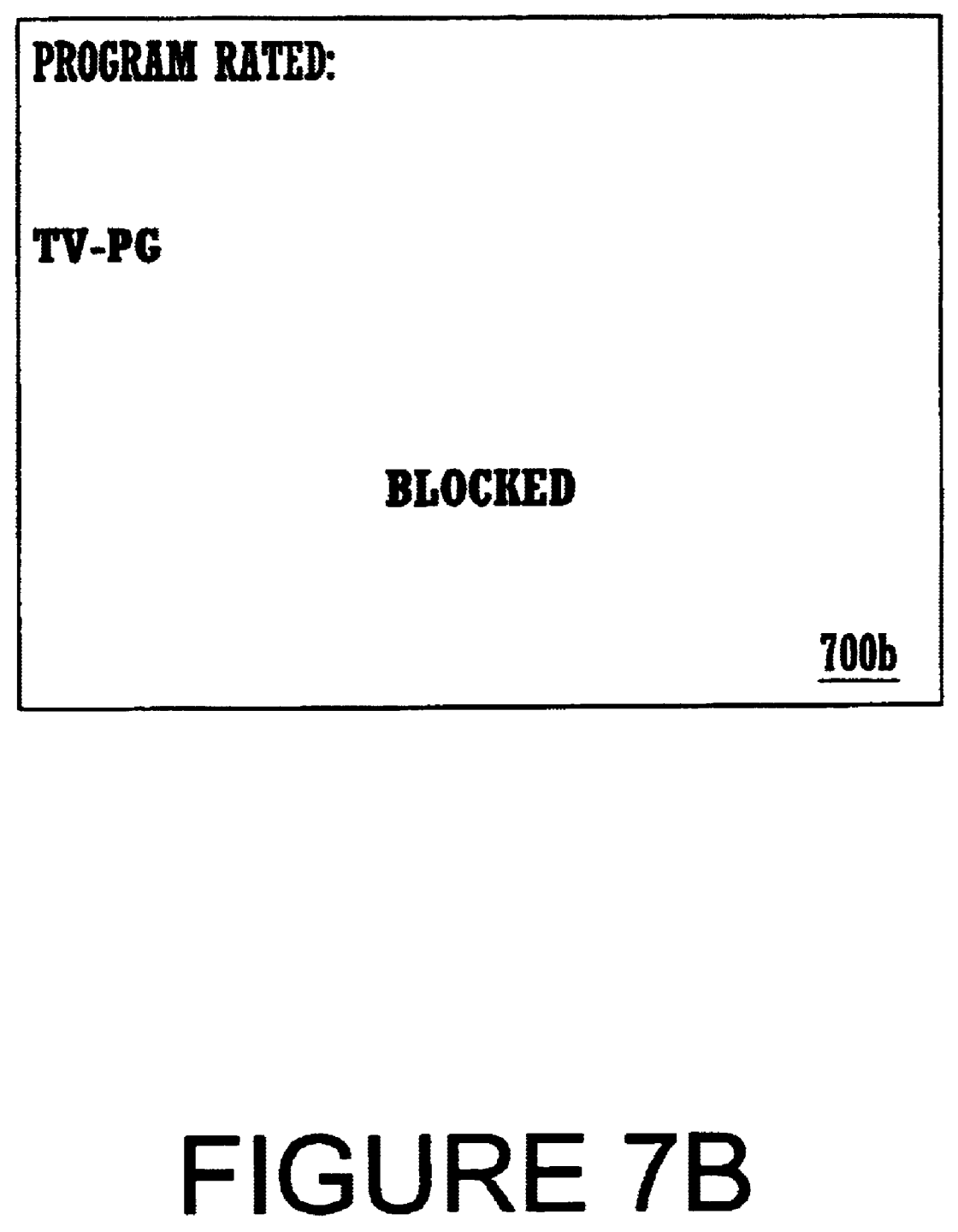

Referring now to FIG. 7B, a second graphical user interface (GUI) for enabling a V-chip setting is shown, in accordance with one embodiment of the present invention. Second GUI 700b for enabling a V-chip setting shows the preset V-chip setting. In this manner, the setting can be confirmed by the viewer prior to watching so that corrections may be made, if necessary. This step helps prevent a user from missing a desired media content that may have been blocked by an inadvertent V-chip setting.

In view of the embodiments presented herein, the present invention provides a method and apparatus for implementing multiple V-chip settings on a display device. Thus the present invention eliminates the need to constantly reprogram the V-chip setting each time the viewer category changes. Furthermore, the present invention also provides a method and apparatus with control and security features for the V-chip setting available to a given viewer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of implementing a plurality of V-chip settings on a display device, said method comprising the steps of:
   a) receiving a first V-chip setting;
   b) storing said first V-chip setting into a first portion of memory, wherein said first portion of said memory is separately removable from said display device;
   c) receiving a second V-chip setting;
   d) storing said second V-chip setting into a second portion of said memory, wherein said second portion of said memory is separately removable from said display device;
   e) enabling a selected one of said plurality of V-chip settings; and
   f) providing media to said display device according to said selected one of said plurality of V-chip settings that is enabled.

2. The method recited in claim 1 wherein said first portion and said second portion of memory are each flash memory devices.

3. The method recited in claim 1 wherein said first portion and said second portion of memory are each memory stick devices.

4. The method recited in claim 1 further comprising the step of:
   g) selecting said selected one of said plurality of V-chip settings by a user input.

5. The method recited in claim 4 further comprising the step of:
   h) providing a graphical user interface capable of receiving said plurality of V-chip settings and participating in said selecting step with said user input.

6. The method recited in claim 1 further comprising the step of:
   g) password protecting one or more of said plurality of V-chip settings.

7. The method recited in claim 4 wherein said step of selecting includes a password.

8. The method recited in claim 1 wherein said selected one of said plurality of V-chip settings is enabled by installing one of a plurality of said portion of memory containing said selected one of said plurality of V-chip settings into a flash memory device.

9. A display system having V-chip capability for screening media data, said display system comprising:
   a display device;
   an input for receiving signals from a signal source, said input coupled to said display device;
   a memory device for receiving one or more of a plurality of removable memory, wherein each one of said plurality of removable memory contains one of a plurality of V-chip settings; and
   a V-chip coupled to said input, said V-chip provides for filtering said signals from said signal source according to one of said plurality of V-chip settings.

10. The display system recited in claim 9 wherein said removable memory is flash memory.

11. The display system recited in claim 9 wherein said removable memory is a memory stick.

12. The display system recited in claim 9 further comprising a user input device for allowing a user to select said one of said plurality of V-chip settings contained on said one or more of said plurality of removable memory.

13. The display system recited in claim 9 wherein said one of said plurality of V-chip settings is enabled by a password.

14. The display system recited in claim 13 further comprising a user device for allowing a user to enter said password.

15. A computer readable medium containing therein computer readable codes for causing an electronic device to provide a method of implementing a plurality of V-chip settings on a display device, said method comprising:

receiving one of a plurality of V-chip settings, wherein each of said plurality of V-chip settings is contained on one of a plurality of attachable memory;

receiving a plurality of media from a signal source; and filtering said plurality of media according to said one of said plurality of V-chip settings.

16. The computer readable medium according to claim 15, further comprising enabling said one of said plurality of V-chip settings.

17. The computer readable medium according to claim 16, wherein enabling said one of said plurality of V-chip settings comprises receiving a correct password from a user.

18. The computer readable medium according to claim 15, further comprising storing a viewing history on said one of said plurality of attachable memory.

19. The computer readable medium according to claim 15, further comprising providing a graphical user interface for choosing said plurality of V-chip setting selections.

20. The computer readable medium according to claim 15, further comprising protecting said other of said plurality of V-chip settings with a password.

\* \* \* \* \*